US010458655B2

(12) United States Patent
Boardman et al.

(10) Patent No.: US 10,458,655 B2
(45) Date of Patent: Oct. 29, 2019

(54) FUEL NOZZLE ASSEMBLY

(71) Applicant: General Electric Company, Schenectady, NY (US)

(72) Inventors: Gregory Allen Boardman, West Chester, OH (US); Gerardo Antonio Salazar Lois, West Chester, OH (US); Jeffrey Michael Martini, Liberty Township, OH (US); Rajesh Sharma, Bangalore (IN); Rishikesh Prakash Karande, Thane (IN)

(73) Assignee: General Electric Company, Schenectady, NY (US)

( * ) Notice: Subject to any disclaimer, the term of this patent is extended or adjusted under 35 U.S.C. 154(b) by 493 days.

(21) Appl. No.: 14/788,644

(22) Filed: Jun. 30, 2015

(65) Prior Publication Data
US 2017/0003031 A1    Jan. 5, 2017

(51) Int. Cl.
| F23R 3/00 | (2006.01) |
| F23R 3/28 | (2006.01) |
| F23D 11/12 | (2006.01) |
| F23D 14/58 | (2006.01) |
| B05B 1/34 | (2006.01) |
| B05B 7/00 | (2006.01) |
| F02C 7/22 | (2006.01) |

(52) U.S. Cl.
CPC ............... *F23R 3/286* (2013.01); *B05B 1/34* (2013.01); *B05B 7/00* (2013.01); *F02C 7/222* (2013.01); *F23D 11/12* (2013.01); *F23D 14/58* (2013.01); *F05D 2220/32* (2013.01)

(58) Field of Classification Search
CPC .......... F23D 14/64; F23D 14/62; F23D 14/58; F23D 11/12; F23R 3/14; F23R 3/12; F23R 3/10; F23R 3/286; F02C 7/22
See application file for complete search history.

(56) References Cited

U.S. PATENT DOCUMENTS 4,548,034 A  * 10/1985  Maguire ................. F02K 1/386
                                                          181/220
5,235,813 A      8/1993  McVey et al.
(Continued)

FOREIGN PATENT DOCUMENTS

| CN | 1441194 A | 9/2003 |
| CN | 101625131 A | 1/2010 |

(Continued)

OTHER PUBLICATIONS

International Search Report and Written Opinion issued in connection with corresponding PCT Application No. PCT/US2016/036142 dated Aug. 23, 2016.

(Continued)

Primary Examiner — Craig Kim
Assistant Examiner — Edwin Kang
(74) Attorney, Agent, or Firm — Fletcher Yoder, P.C.

(57) ABSTRACT

A system includes a fuel nozzle including a first wall disposed about a central axis, a second wall disposed about the first wall, and a plurality of lobes disposed between the first and second walls, wherein the plurality of lobes is spaced about the central axis to define a plurality of flow passages, and the plurality of flow passages is configured to output a plurality of flows into a flame region.

17 Claims, 9 Drawing Sheets

(56) References Cited

U.S. PATENT DOCUMENTS

| | | | |
|---|---|---|---|
| 5,622,054 A * | 4/1997 | Tingle | F23D 14/62 60/737 |
| 5,638,682 A | 6/1997 | Joshi et al. | |
| 5,822,992 A | 10/1998 | Dean | |
| 6,082,635 A | 7/2000 | Seiner et al. | |
| 2002/0026796 A1 | 3/2002 | Gutmark et al. | |
| 2006/0156734 A1* | 7/2006 | Bland | F23R 3/12 60/776 |
| 2007/0113555 A1 | 5/2007 | Carroni | |
| 2011/0232289 A1 | 9/2011 | Colmegna et al. | |
| 2012/0297787 A1* | 11/2012 | Poyyapakkam | B01F 5/0451 60/772 |
| 2013/0104552 A1 | 5/2013 | Uhm et al. | |
| 2013/0199199 A1* | 8/2013 | Moddemann | F23R 3/32 60/776 |
| 2013/0241089 A1 | 9/2013 | Westmoreland et al. | |
| 2015/0000285 A1 | 1/2015 | Deiss et al. | |
| 2015/0013339 A1* | 1/2015 | Ciani | F23R 3/18 60/737 |

FOREIGN PATENT DOCUMENTS

| | | |
|---|---|---|
| CN | 104019465 A | 9/2014 |
| CN | 104271887 A | 1/2015 |
| EP | 2604919 A1 | 6/2013 |
| EP | 2629011 A1 | 8/2013 |

OTHER PUBLICATIONS

Chinese Office Action for CN Application No. 201680038851.2 dated May 28, 2019; 18 pgs.

\* cited by examiner

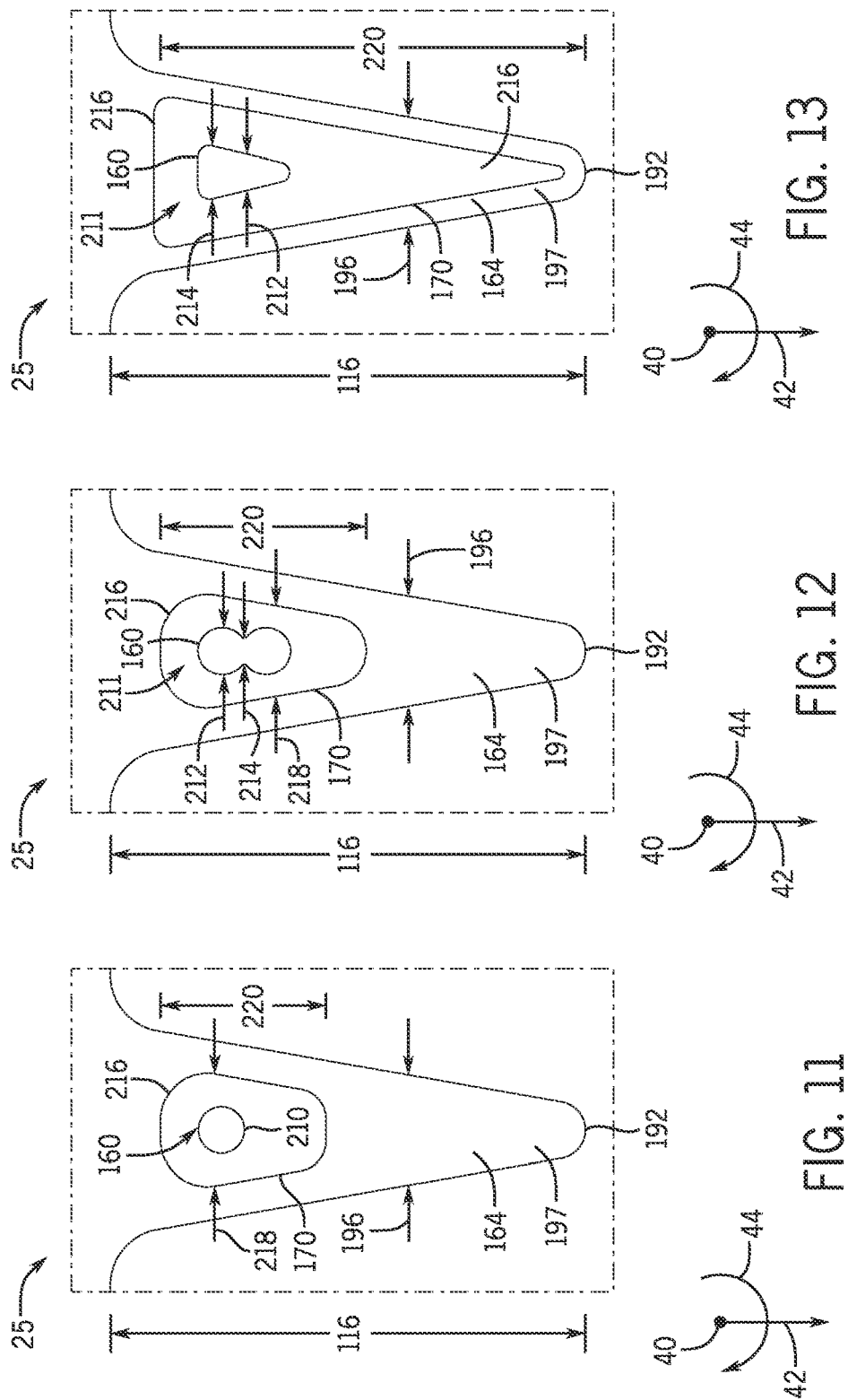

FUEL NOZZLE ASSEMBLY

BACKGROUND OF THE INVENTION

The subject matter disclosed herein relates to gas turbine engines and, more specifically, to a fuel nozzle assembly of the gas turbine engine.

A gas turbine engine combusts a mixture of fuel and air to generate hot combustion gases, which in turn drive one or more turbine stages. In particular, the hot combustion gases force turbine blades to rotate, thereby driving a shaft to rotate one or more loads, e.g., an electrical generator. The gas turbine engine includes one or more fuel nozzle assemblies to inject fuel and air into a combustor. The design and construction of the fuel nozzle assembly can significantly impact exhaust emissions (e.g., nitrogen oxides, carbon monoxide, etc.) as well as the life of components of the fuel nozzle assembly. Furthermore, the design and construction of the fuel nozzle assembly can significantly affect the time, cost, and complexity of installation, removal, maintenance, and general servicing. Therefore, it would be desirable to improve the design and construction of the fuel nozzle assembly.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a fuel nozzle including a first wall disposed about a central axis, a second wall disposed about the first wall, and a plurality of lobes disposed between the first and second walls, wherein the plurality of lobes is spaced about the central axis to define a plurality of flow passages, and the plurality of flow passages is configured to output a plurality of flows into a flame region.

In a second embodiment, a system includes a fuel nozzle including a first wall disposed about a central axis, a second wall disposed about the first wall, and a plurality of lobes disposed between the first and second walls. The plurality of lobes is spaced about the central axis to define a plurality of flow passages and the plurality of lobes extends to a downstream end portion of the fuel nozzle.

In a third embodiment, a system includes a fuel nozzle including a plurality of lobes. The plurality of lobes is spaced about a central axis to define a plurality of flow passages, and the plurality of lobes extends to a downstream end portion of the fuel nozzle.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 11 is a partial top view of an embodiment of the lobed shroud, wherein the lobed shroud includes a lobe pilot opening having a circular shape;

FIG. 12 is a partial top view of an embodiment of the lobed shroud, wherein the lobed shroud includes a lobe pilot opening having a plurality of bulbs; and FIG. 13 is a partial top view of an embodiment of the lobed shroud, wherein the lobed shroud includes a lobe pilot having a tapered shape.

DETAILED DESCRIPTION OF THE INVENTION

Figure 1:
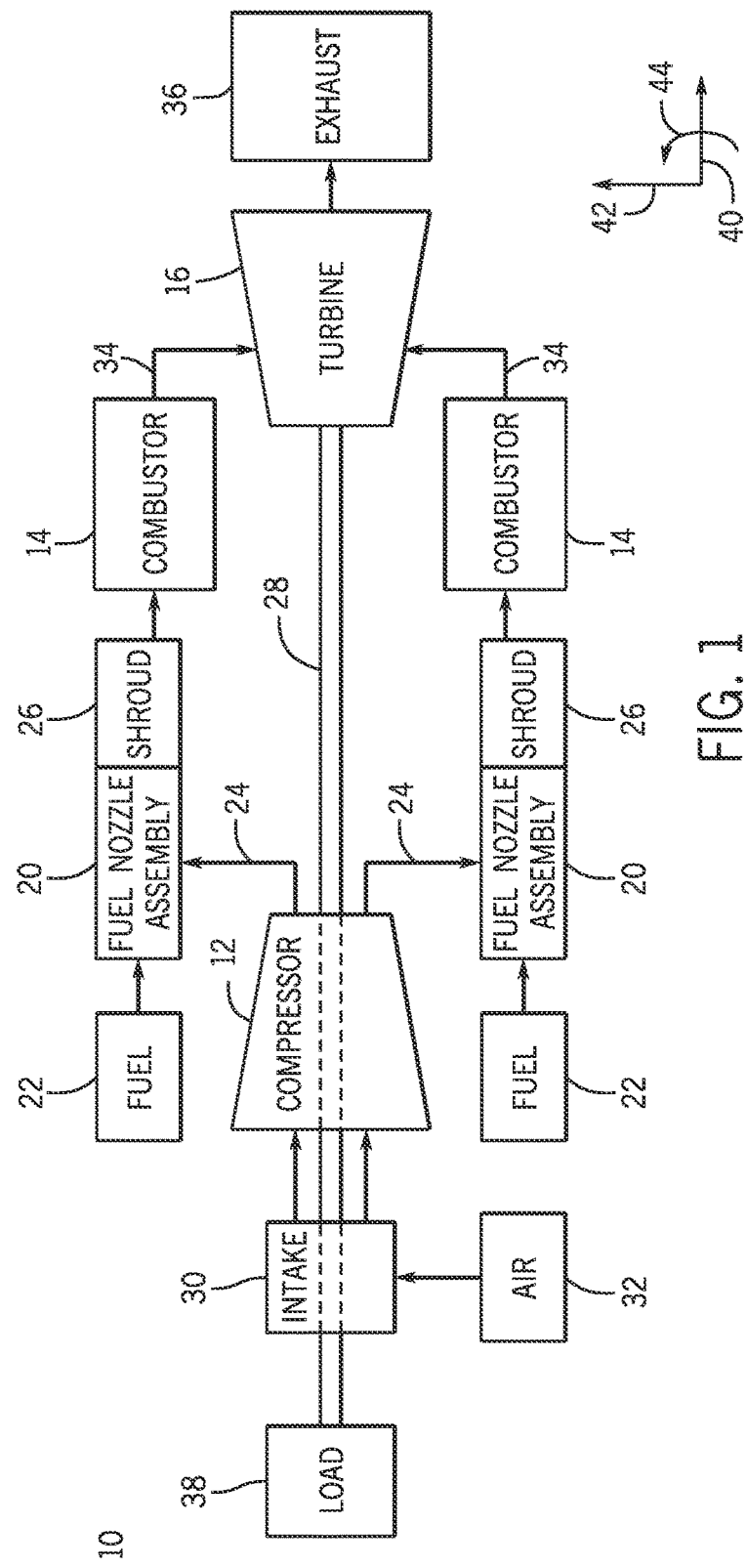
FIG. 1 is a block diagram of an embodiment of a turbine system have a fuel nozzle assembly that includes a lobed shroud.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to a fuel nozzle assembly for use in a gas turbine engine. The fuel nozzle assembly provides a mixture of fuel and oxidant (e.g., air) to a combustion region (e.g., a flame region) of the gas turbine engine to generate a flame. The turbine converts the thermal energy from the flame to mechanical energy used to provide power to a machine, e.g., an electric generator, pump, etc. The fuel nozzle assembly generally controls the characteristics of the flame (e.g., length, shape, etc.) downstream of the fuel nozzle assembly in the combustion region as well as production of emissions. For example, the fuel nozzle assembly includes a support structure (e.g., a main body) that defines an interior volume for receiving the fuel and an air flow, thereby generating the mixture. Additionally, the fuel nozzle assembly includes a nozzle shroud removably coupled to the support structure that includes multiple lobes defining passages that separate a flow of the fuel and air mixture into a plurality of streams spaced apart from one another. The lobes extend to a downstream end portion of the fuel nozzle assembly, thereby helping to separate the streams as they exit from the fuel nozzle assembly. By separating the fuel and air mixture into multiple streams in the fuel nozzle assembly, a primary flame generated in the combustion region may be separated into a plurality of flames that have a shorter flame length (and smaller volume) compared to a primary flame generated from a non-segmented fuel and air mixture. In addition, the fuel nozzle assembly includes multiple hydraulic diameters that accelerate mixing of the fuel and air mixture, thereby generating a homogenous fuel and air mixture that burns (e.g., combusts) uniformly. As such, the fuel nozzle assembly disclosed herein may decrease emissions generated at high flame temperatures (e.g., flame temperatures greater than 1500° C.), and may be used in combustors that have a small reaction zone volume (e.g., a reaction zone time of approximately 5 millisecond (msec) or less). The hydraulic diameter of the fuel nozzle assembly is defined as four times a flow area (FA)/wetted perimeter (P) (4 FA/P), where P is the perimeter surface in contact with the flow of the fuel/air mixture.

The nozzle shroud also includes lobe passages (e.g., lobe fingers) that mix additional fuel and oxidant (e.g., air), and direct the additional fuel and air mixture to the combustion region to generate secondary flames. The secondary flames anchor the plurality of flames to the nozzle shroud assembly, thereby stabilizing the plurality of primary flames at lower load conditions. By changing the characteristics of the primary flame (e.g., flame length/shape), the production of CO and unburned hydrocarbon (UHC) emissions may be reduced (i.e., the combustion efficiency increased), for flame temperatures below approximately 1500° C. In addition, because the disclosed fuel nozzle increases combustion efficiency, the fuel nozzle assembly may be used with combustors having small reaction-time zones. As such, the presently described system may lower manufacturing costs, extend equipment lifetime, and/or lower emissions, for example.

FIG. 1 illustrates a block diagram of an embodiment of a turbine system 10. As described in detail below, the disclosed turbine system 10 (e.g., a gas turbine engine) may employ a fuel nozzle assembly, described below, which may improve system durability, operability, and reliability. As shown, the system 10 includes a compressor 12 (e.g., with one or more compression stages), one or more turbine combustors 14, and a turbine 16 (e.g., with one or more turbine stages). The turbine combustor 14 may be an annular combustor extending circumferentially about a rotational axis of the turbine system 10, or the system 10 may include a plurality of combustors 14 circumferentially spaced about the rotational axis. The turbine combustors 14 may include one or more fuel nozzle assemblies 20 configured to receive both fuel 22 and pressurized oxidant 24, such as air, oxygen, oxygen-enriched air, oxygen reduced air, or any combination thereof. Although the following discussion refers to the oxidant as the air 24, any suitable oxidant may be used with the disclosed embodiments. Furthermore, in certain embodiments, one or more fluids (e.g., fuel, steam, inert gas such as nitrogen, exhaust gas recirculation (EGR) gas, or any combination thereof) may be added to the oxidant upstream from the fuel nozzle assemblies 20. The fuel nozzle assemblies 20 route the fuel 22 (e.g., liquid fuel and/or gas fuel, such as natural gas, syngas, or a combination thereof) into the turbine combustors 14. Each fuel nozzle assembly 20 includes a lobed shroud 26, described in further detail below with reference to FIGS. 3-13. The lobed shroud 26 is disposed on a downstream end of the fuel nozzle assembly 20, adjacent the turbine combustors 14. The lobed shroud 26 includes a plurality of lobes 25 (e.g., radial protrusions) disposed circumferentially about the fuel nozzle assembly 20, thereby defining a plurality of lobe passages 27 (e.g., intermediate slots, flow passages, or lobe flow passages) disposed circumferentially about the fuel nozzle assembly 20. In other words, the lobed shroud 26 alternates between lobes 25 and lobe passages 27 in the circumferential direction about the fuel nozzle assembly 20. In this manner, the plurality of lobe passages 27 (due to the circumferential splits or segments caused by the lobes 25) segment the flow of fuel 22 and air 24 into a plurality of substantially separate flows or streams of mixed fuel-air flows (or streams) that exit the fuel nozzle assembly 20. In addition, the lobed shroud 26 defines additional passages that separate a flow of the fuel and the air mixture, e.g., one or more micro-mixing passages in each of the lobes 25. As such, the primary flame generated from combustion of the fuel and air mixture in the additional passages may be separated into a plurality of short primary flames compared to the primary flame of a non-segmented fuel and air mixture. By decreasing the length of the primary flame, the overall volume of the combustion region, and consequently the combustors 14, may be reduced.

Compressor blades are included as components of the compressor 12. The blades within the compressor 12 are coupled to a shaft 28, and will rotate as the shaft 28 is driven to rotate by the turbine 16, as described below. The rotation of the blades within the compressor 12 compresses air 32 from an air intake 30 into pressurized air 24. The pressurized air 24 is then fed into the fuel nozzle assembly 20 of the turbine combustors 14. A first portion of the pressurized air 24 and fuel 22 is mixed in the passages defined by the lobed shroud 26 and a center body of the fuel nozzle assembly 20, and a second portion of the pressurized air 24 and fuel 22 is mixed in the lobe passages associated with lobes of the lobed shroud 26. As such, the first and second portions of the pressurized air 24 and fuel 22 produce a suitable fuel-air mixture ratio for combustion (e.g., a combustion that causes the fuel to more completely burn) so as not to waste fuel 22 or cause excess emissions.

The turbine combustors 14 ignite and combust the fuel-air mixture, and then pass hot pressurized combustion gases 34

(e.g., exhaust) into the turbine 16. Turbine blades are coupled to the shaft 28, which is also coupled to several other components throughout the turbine system 10. As the combustion gases 34 flow against and between the turbine blades in the turbine 16, the turbine 16 is driven into rotation, which causes the shaft 28 to rotate. Eventually, the combustion gases 34 exit the turbine system 10 via an exhaust outlet 36. Further, the shaft 28 may be coupled to a load 38, which is powered via rotation of the shaft 28. For example, the load 38 may be any suitable device that may generate power via the rotational output of the turbine system 10, such as an electrical generator, a propeller of an airplane, and so forth.

Figure 2:
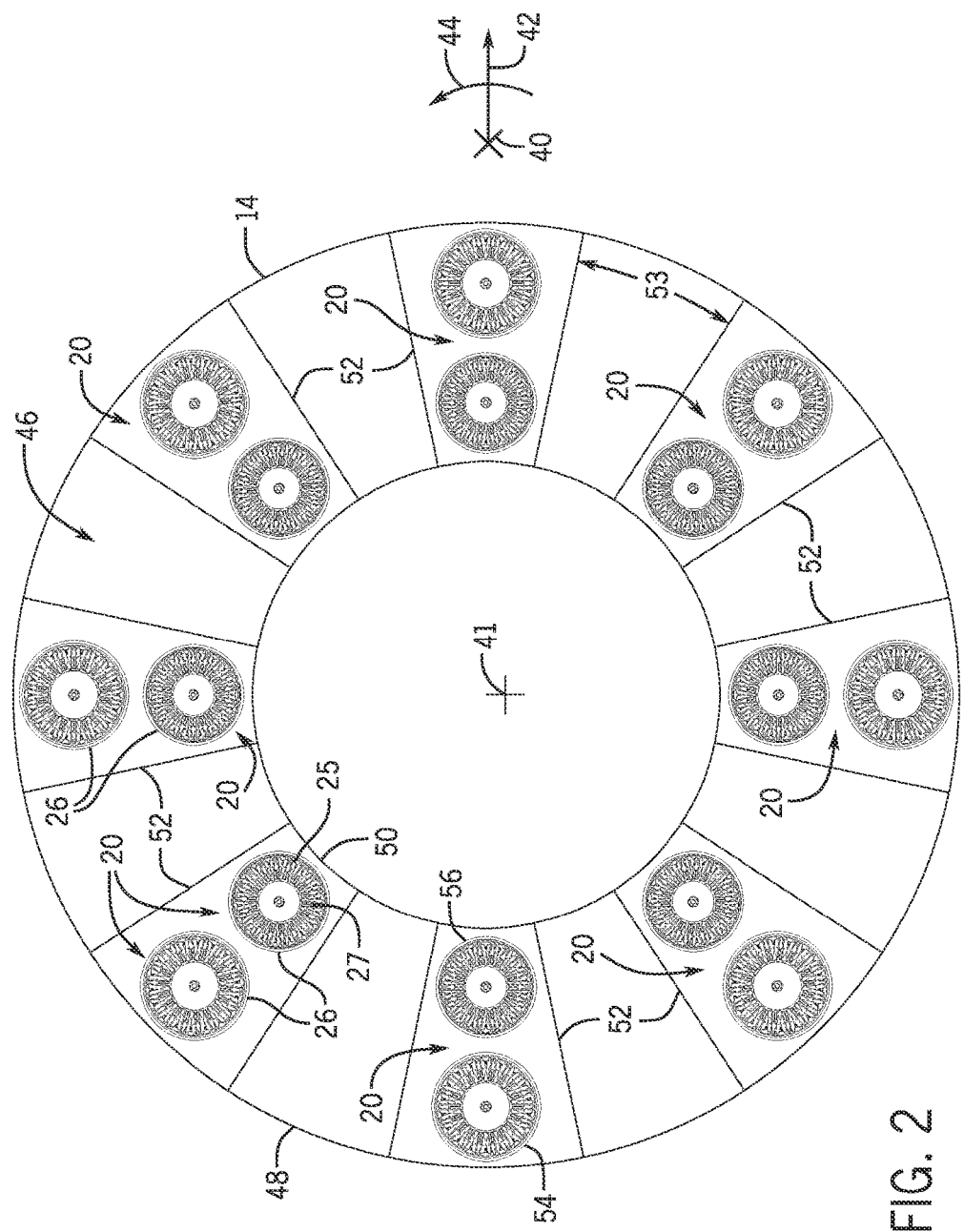
FIG. 2 is a cross-sectional view of an embodiment of a combustor of the turbine system of FIG. 1, wherein the combustor includes multiple fuel nozzle assemblies having the lobed shroud.

As discussed above, the lobed shroud 26 separates (e.g., segments) at least a portion of a flow of the fuel and air mixture flowing through the fuel nozzle assembly 20. In the following discussion, reference may be made to an axial axis or direction 40, a radial axis or direction 42, and/or a circumferential axis or direction 44 of the turbine system 10. FIG. 2 is a perspective view of the turbine combustor 14 (e.g., annular combustor) of the system 10 having the one or more fuel nozzle assemblies 20 and the associated lobed shroud 26 for supplying the turbine combustors 14 with the fuel 22 and the air 24. While the following discussion refers to the turbine combustor 14 as an annular combustor, any other suitable combustor configuration may be used with the fuel nozzle assembly 20. In the illustrated embodiment, the turbine combustor 14 includes an annular region 46 defined by a first combustor boundary 48 (e.g., inner annular wall) and a second combustor boundary 50 (e.g., outer annular wall). The wall 50 (e.g., second combustor boundary) is disposed circumferentially about a rotational axis 41, the region 46 is disposed circumferentially about the wall 50, and the wall 48 (e.g., first combustor boundary) is disposed circumferentially about the region 46 and the wall 50. The turbine combustor 14 includes multiple nozzle stems 52 (e.g., radial protrusions, arms, spokes, or cantilevered members) within the annular region 46. For example, the turbine combustor 14 may include 1, 2, 3, 4, 5, 6, 7, 8, 9, 10, 11, 12, 13, 14, 15, or more nozzle stems 52. Each nozzle stem 52 is circumferentially (e.g., along the circumferential axis 44) spaced apart a distance 53 from an adjacent nozzle stem 52. The nozzle stems 52 may include a mounting system (e.g., mounting flange) to facilitate coupling, and secure, the nozzle stem 52 to the turbine combustor 14.

The illustrated nozzle stems 52 each include two fuel nozzle assemblies 20. For example, the nozzle stems 52 may include an outer fuel nozzle assembly 54 and an inner fuel nozzle assembly 56. In certain embodiments, the nozzle stems 52 may each include one fuel nozzle assembly 20 or any number of nozzle assemblies 20 (e.g., 1, 2, 3, 4, 5, 6, 7, 8, 9, 10, or more). As discussed above, the fuel nozzle assemblies 20 are configured to route a mixture of the fuel 22 and the air 24 into the combustor region of the turbine combustor 14. For example, the fuel nozzle assemblies 20 direct the fuel and air mixture into the annular region 46 of the turbine combustor 14, where the fuel and air mixture undergoes combustion to generate the thermal energy used to power one or more machines (e.g., electrical generator, airplane propeller, etc.). The outer and inner fuel nozzle assemblies 54, 56 on each respective nozzle stem 50 may output the same or different type, composition, and/or amount of the fuel 22 and/or the oxidant 24. For example, the outer fuel nozzle assembly 54 may output liquid fuel 22 and the inner fuel nozzle assembly 56 may output gas fuel 22 or vice versa. Similarly, the outer fuel nozzle assembly 54 may output air 24 and the inner fuel nozzle assembly 56 may output natural gas and/or syngas (e.g., oxidant 24) or vice versa.

In certain embodiments, the lobed shroud 26 of the outer and inner fuel nozzle assemblies 54, 56 may have an equal number of lobes defining the passages that separate the flow of the fuel and air mixture. For example, the lobed shroud 26 of the outer and the inner fuel nozzle assemblies 54, 56 may each have any number of lobes 25 from 2 to 100 or more, e.g., 2, 4, 6, 8, 10, 15, 20, 25, or more lobes 25. In other embodiments, the number of lobes 25 in the lobed shroud 26 of each respective fuel nozzle assembly 54, 56 are different.

Figure 3:
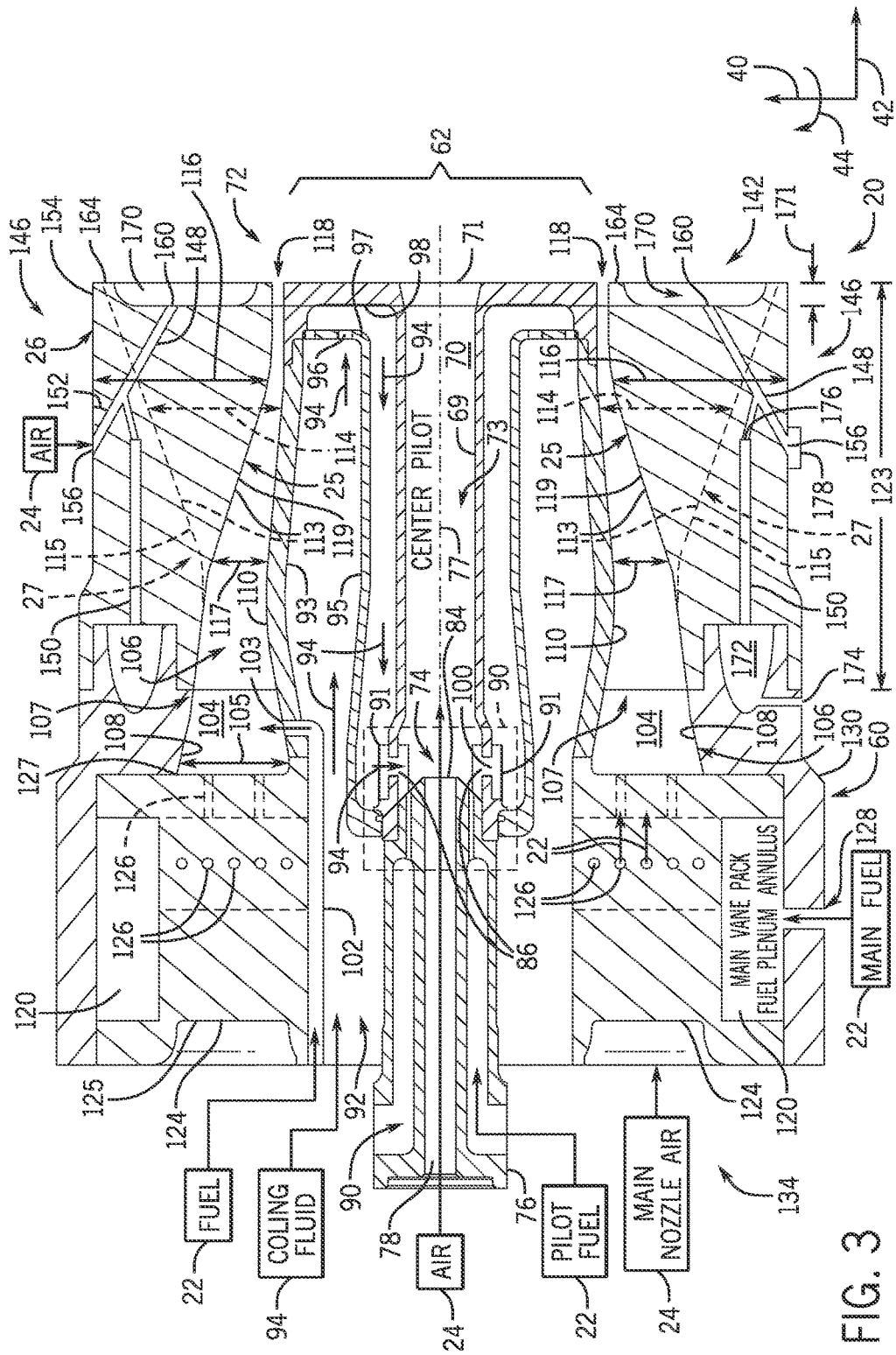
FIG. 3 is a cross-sectional view of an embodiment of the fuel nozzle assembly and lobed shroud of FIG. 1, wherein the fuel nozzle assembly and lobed shroud include multiple fuel injection ports and multiple fuel and air mixing regions.
Figure 7:
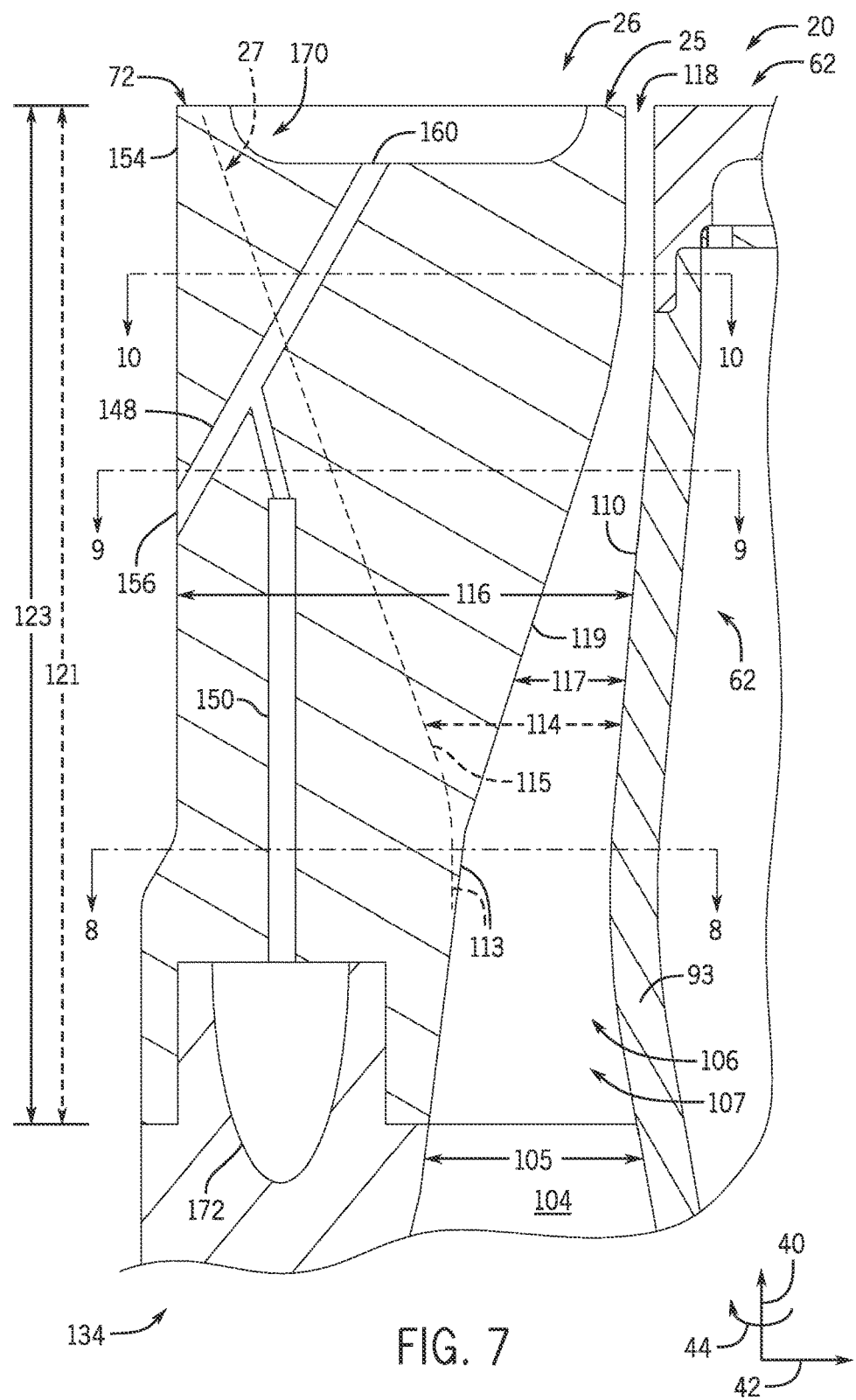
FIG. 7 is a cutaway view of an embodiment of the lobed shroud, wherein the lobed shroud includes a lobe passage with a decreasing diameter towards the downstream end portion of the fuel nozzle assembly.

FIG. 3 is a cross-sectional view of an embodiment of the fuel nozzle assembly 20 that may be used to supply the turbine combustor 14 with the fuel 22 and the air 24. A detailed view of the lobed shroud 26 is also shown in FIG. 7, and is referenced throughout the discussion of FIG. 3. In addition to the lobed shroud 26, the fuel nozzle assembly 20 includes a main body 60 (e.g., support structure) and a center body 62. In one embodiment, the main body 60, the center body 62, and the lobed shroud 26 are separate structures that are removably coupled together, e.g., via removable fasteners, such as bolts, clamps, interference fits, male-female joints, or any combination thereof. The main body 60, the center body 62, and the lobed shroud 26 each extend circumferentially 44 about an axial axis 77 of the fuel nozzle assembly 20, and may have a generally annular shape. In certain embodiments, each component of the fuel nozzle assembly 20 (e.g., the main body 60, the center body 62, and the lobed shroud 26) is separable. In other embodiments, the main body 60 and the center body 62 are a single structure (e.g., integrally formed as one-piece), and the lobed shroud 26 is a separate structure that is removably coupled to the single structure (e.g., bodies 60, 62). That is, the bodies 60, 62 are inseparable, and the lobed shroud 26 is separable (e.g., removable). As should be noted, the main body 60, the center body 62, and the lobed shroud 26 may be a single structure (e.g., non-separable). The main body 60, the center body 62, and the lobed shroud 26 may be manufactured via 3-D printing/additive manufacturing techniques, such that the main body 60, the center body 62, and the lobed shroud 26 are one structure (e.g., not removably coupled) or separate structures (e.g., removably coupled). In embodiments having the lobed shroud 26 removably coupled to the main body 60, the main body 60 and the lobed shroud 26 may include coupling features, such as bolts, screws, fasteners, or any other suitable coupling mechanism, that facilitate coupling and decoupling of the main body 60 and the lobed shroud 26. In certain embodiments, the center body 62 may be coupled to the main body 60, the lobed shroud 26, or a combination thereof, via an interference fit.

The fuel nozzle assembly 20 includes various features that facilitate a flow of the fuel 22 and the air 24 through an interior volume of the fuel nozzle assembly 20 that is defined by the main body 60, the center body 62, and the lobed shroud 26. For example, the center body 62 includes a center pilot conduit 69 (e.g., central annular wall) defining a center pilot 70 having a first center pilot opening 71 (e.g., axial opening) at a downstream end portion 72 of the fuel nozzle assembly 20, and a second center pilot opening 74 axially 40 upstream from the end portion 72. The conduit 69 (or wall) extends circumferentially 44 about the axial axis 77, thereby defining an axial passage 73 extending axially 40 between the openings 71 and 74.

The second center pilot opening 74 is fluidly coupled to a fuel injector 76 having a first center pilot passage 78 (e.g., conduit) and one or more second center pilot passages 80

(e.g., conduits). The first center pilot passage 78 extends along the axial axis 77, while the one or more second center pilot passages 80 are radially 42 offset from the axial axis 77. In certain embodiments, the passages 78, 80 (e.g., conduits) are coaxial with one another and/or with the axial axis 77 of the fuel nozzle assembly 20. For example, the second center pilot passage 80 (e.g., conduit) may be disposed circumferentially 44 about the first center pilot passage 78 (e.g., conduit), such that second center pilot 80 forms an annulus around the first center pilot passage 78. The passages 78, 80 receive the fuel 22 and/or the pressurized air 24 (e.g., from the compressor 12) and supply the fuel 22 and/or the air 24 to a mixing region 90 (e.g., as indicated by dashed box) associated with the center pilot 70, via first and second pilot openings 84, 86, respectively. The first mixing region 90 may include one or more vanes 91 (e.g., swirl vanes or radial swirlers) adjacent to the openings 84, 86 to facilitate mixing of the fuel 22 and the air 24. For example, the first mixing region 90 may include 1, 2, 3, 4, 5, 6, 7, 8, 9, 10, or more swirl vanes 91.

The center body 62 also includes a tip cooling passage 92 (e.g., walls or conduits 93 and 95) radially 42 offset from the axial axis 77 and the center pilot 70. The tip cooling passage 92 may include a plurality of discrete passages spaced circumferentially 44 about the axial axis 77 and/or a common annular passage extending circumferentially 44 about the axial axis 77. In certain embodiments, the tip cooling passage 92 may be coaxial with the center pilot 70 (e.g., along axial axis 77). The tip cooling passage 92 (e.g., conduits 93 and 95) circumferentially 44 surrounds at least a portion of the center pilot 70 (e.g., conduit 69) at the downstream end portion 72. In the illustrated embodiment, the conduit 93 (e.g., annular wall) circumferentially 44 surrounds a downstream directed portion of the passage 92 and the conduit 95 (e.g., annular wall), the conduit 95 circumferentially 44 surrounds an upstream directed portion of the passage 92 and the conduit 69 of the center pilot 70, and the conduit 69 (e.g., annular wall) surrounds the passage 73 along the axial axis 77.

A cooling fluid (e.g., the fuel 22 and/or pressurized air 24) flows through the tip cooling passage 92 (e.g., between conduits 93 and 95) towards the downstream end portion 72, as illustrated by arrow 94, and cools the downstream end portion 72 of the fuel nozzle assembly 20 (e.g., via film cooling, impingement cooling, or any other suitable cooling technique). For example, in the illustrated embodiment, the cooling fluid 94 flows through one or more axial impingement openings 96 (e.g., 1 to 100) in a perforated cooling plate 97 (e.g., impingement and/or film cooling plate) near the downstream end portion 72 and impinges on an inner surface 98 (e.g., axial end plate) of the fuel nozzle assembly 20, thereby cooling the inner surface 98. For example, a plurality of the impingement openings 96 (e.g., greater than or equal to 1, 2, 3, 4, 5, 6, 7, 8, 9, 10, 15, 20, 50, or more) may be circumferentially 44 spaced about the axial axis 77 at different radial and circumferential positions along the plate 97, and the impingement openings 96 may be oriented at different angles relative to the axial axis 77 (e.g., parallel or acutely angled at 10, 20, 30, 40, 50, 60, 70, or 80 degrees). Each impingement opening 96 has a smaller diameter compared to a radial 42 width of the cooling passage 92 (e.g., upstream of the impingement openings 96). In this way, a velocity of the cooling fluid 94 flowing through the impingement openings 96 increases, thereby facilitating impingement of the cooling fluid 94 and cooling on the inner surface 98.

After impingement on the inner surface 98, the cooling fluid 94 flowing through the passage 92 changes flow directions from a downstream axial direction (e.g., between conduits 93 and 95) to an upstream axial direction (e.g., between conduits 95 and 69). The cooling passage 92 (e.g., between conduits 95 and 69) directs the cooling fluid 94 upstream towards the first mixing region 90, where the cooling fluid 94 exits the tip cooling passage 92 via one or more radial openings 100 (e.g., 1 to 100) through the conduit 69 (e.g., annular wall of center pilot 70) within the first mixing region 90. For example, a plurality of the radial openings 100 (e.g., greater than or equal to 1, 2, 3, 4, 5, 6, 7, 8, 9, 10, 15, 20, 50, or more) may be circumferentially 44 spaced about the axial axis 77 at different axial and circumferential positions along the conduit 69, and the radial openings 100 may be oriented at different angles relative to the axial axis 77 (e.g., perpendicular or acutely angled at 10, 20, 30, 40, 50, 60, 70, or 80 degrees). The cooling fluid 94 mixes with the fuel 22 and the air 24 exiting the fuel injector 76 in the first mixing region 90 before exiting the fuel nozzle assembly 20 through the first center pilot opening 71.

In addition to the fuel injector 76, the fuel nozzle assembly 20 includes additional fuel injection ports that provide additional fuel 22 to other mixing regions within the fuel nozzle assembly 20. For example, the center body 62 includes one or more fuel passages 102 (e.g., fuel conduits) extending to fuel ports 103 (e.g., fuel injection outlets) fluidly coupled to a mixing chamber 104 (e.g., an annular chamber) within a second mixing region 106. As discussed in further detail below, the mixing chamber 104 may gradually converge into a throat 107 (e.g., annular throat with a reduced cross-sectional flow area) directly upstream of the lobes 25 and lobe passages 27. The fuel ports 103 may be located upstream, downstream, or directly at the axial location of the throat 107. Furthermore, a plurality of the fuel ports 103 (e.g., greater than or equal to 1, 2, 3, 4, 5, 6, 7, 8, 9, 10, 15, 20, 50, or more) may be circumferentially 44 spaced about the axial axis 77 at different axial, radial and circumferential positions, and the fuel ports 103 may be oriented at different angles relative to the axial axis 77 (e.g., parallel, perpendicular, or acutely angled at 10, 20, 30, 40, 50, 60, 70, or 80 degrees). In certain embodiments, the fuel passage 102 includes a first portion that extends axially 40 along the axial axis 77 of the fuel nozzle assembly 20, and a second portion (including fuel ports 103) that is crosswise to the axis 77 (e.g., along the radial axis 42). The fuel passage 102 supplies the additional fuel 22 to the mixing chamber 104, where the additional fuel 22 is mixed with additional air 24. For example, the additional fuel 22 flows through the fuel passage 102 in the axial direction 40 toward the mixing chamber 104, and then flows through fuel ports 103 into the mixing chamber 104 in the radial direction 42. In the mixing chamber 104, the additional fuel 22 is mixed with an axial flow (e.g., along axial axis 77) of the additional air 24 flowing toward the downstream end portion 72 of the fuel nozzle assembly 20.

The mixing chamber 104 is defined by at least a portion of a main body wall 108 and a first portion of a center body wall 110. The center body wall 110, which may include the wall 93, generally extends circumferentially 44 about the axial axis 77 (e.g., an annular wall 110). The main body wall 108 generally extends circumferentially 44 about the axial axis 77 and the center body wall 110 (e.g., an annular wall 108). The mixing chamber 104 is upstream of a plurality of circumferentially 44 spaced lobe passages 27 (e.g., intermediate passages or slots between adjacent lobes 25) that separate (e.g., circumferentially 44 segment) the fuel and air mixture generated in the mixing chamber 104 into discrete flow paths, resulting in flame shaping and stabilization, as discussed above. In the illustrated embodiment, the lobe passages 27 are defined by a second portion of the center body wall 110 and a first lobed shroud wall 113 (e.g., an interior wall). The lobed shroud wall 113 alternates in diameter circumferentially 44 about the axial axis 77, thereby defining an alternating arrangement of the lobes 25 and the lobe passages 27. For example, as discussed above, the lobed shroud 26 is configured to change the flow geometry of the fuel and air mixture generated in the mixing chamber 104 (e.g., by segmenting), while the lobed shroud 26 also may maintain the flow area of a fuel nozzle assembly that does not include a lobed shroud such as the lobed shroud 26. The change in the flow geometry of the fuel and air mixture enhances premixing in the second mixing region 106, thereby stabilizing the flame in the combustor 14.

As illustrated in FIG. 3 (see also detailed view of FIG. 7), the lobes 25 are shown with solid lines, while the lobe passages 27 are shown with dashed lines. A radial dimension 105 of the mixing chamber 104 is illustrated by solid arrows 105, a radial dimension 114 (e.g., radial passage dimension or radial length) of the lobe passages 27 (e.g., between center body wall 110 and a radially outermost surface 115 of the shroud wall 113) is illustrated by dashed arrows 114, a radial dimension 116 (e.g., radial lobe dimension or radial length) of the lobes 25 (e.g., between a shroud outer wall 154 and a radially innermost surface 119 of the shroud wall 113) is illustrated by solid arrows 116, and a radial dimension 117 (e.g., radial gap dimension) of the lobe gaps 118 (e.g., between the center body wall 110 and a radially innermost surface 119 of the shroud wall 113) is illustrated by solid arrows 117. Furthermore, an axial dimension 121 (e.g., axial passage dimension) of the lobe passages 27 (e.g., between the throat 107 and the downstream end portion 72) is illustrated by solid arrow 121, while an axial dimension 123 (e.g., axial lobe dimension) of the lobes 25 (e.g., between the throat 107 and the downstream end portion 72) is illustrated by solid arrow 123. As discussed in further detail below, the radial dimensions 114, 116, and/or 117 associated with the lobe passages 27, the lobes 25, and the lobe gaps 118 may be constant and/or variable in the axial direction 40 along the axial dimensions 121 and/or 123 of the lobe passages 27 and lobes 25. For example, at least one lobe 25 of the plurality of lobes 25 may include a constant radial lobe dimension 116 along the axial lobe dimension 123 of the lobe 25, or at least one passage 27 of the plurality of lobe passages 27 may include a constant radial passage dimension 114 along the axial passage dimension 121 of the lobe passage 27, or a combination thereof. By further example, at least one lobe 25 of the plurality of lobes 25 may include a variable radial lobe dimension 116 (e.g., gradually increasing, decreasing, or both, in the downstream direction) along the axial lobe dimension 123 of the lobe 25, or at least one passage 27 of the plurality of lobe passages 27 may include a variable radial passage dimension 114 (e.g., gradually increasing, decreasing, or both, in the downstream direction) along the axial passage dimension 121 of the lobe passage 27, or a combination thereof.

In the illustrated embodiment of FIG. 3 (see also detailed view of FIG. 7), the mixing chamber 104 may gradually converge into the throat 107 (e.g., annular throat with a reduced cross-sectional flow area), as indicated by a decrease in the radial dimension or dimension 105 in a downstream direction toward the lobes 25, lobe passages 27, and downstream end portion 72. The throat 107 may then be followed by the lobes 25, lobe passages 27, and lobe gaps 118, which may also vary in radial dimension (e.g., 114, 116, and 117). In the illustrated embodiment, the radially outermost surface 115 defining the lobe passages 27 generally diverges (e.g., linearly, non-linearly, curved) radially outward 42 away from the axial axis 77 in a downstream direction from the throat 107 toward the downstream end portion 72, and thus the radial dimension 114 gradually increases (e.g., linearly or non-linearly) in the downstream direction. In some embodiments, the radial dimension 114 may decrease and/or remain constant for some axial distance prior to increasing in the downstream direction. In contrast, the radially innermost surface 119 defining the lobes 25 and the lobe gaps 118 generally converges (e.g., linearly, non-linearly, curved) radially inward 42 toward the axial axis 77 in a downstream direction toward the downstream end portion 72, and thus the radial dimension 117 gradually decreases (e.g., linearly or non-linearly) in the downstream direction, while the radial dimension 116 gradually increases (e.g., linearly or non-linearly) in the downstream direction. In some embodiments, the radial dimension 117 may increase and/or remain constant for some axial distance prior to decreasing in the downstream direction. Furthermore, the radially outermost surface 115 defining the lobe passages 27 and the radially innermost surface 119 defining the lobes 25 and lobe gaps 118 generally diverge radially 42 away from one another in the downstream direction toward the downstream end portion 72. In some embodiments, the divergence (e.g., increasing radial dimension 114) of the radially outermost surface 115 defining the lobe passages 27 and the convergence (e.g., decreasing radial dimension 117) of the radially innermost surface 119 defining the lobes 25 and lobe gaps 118 may be inversely proportional to one another.

As further illustrated in FIG. 3 (see also detailed view of FIG. 7), the gradually converging lobes 25 and lobe gaps 118 and the gradually diverging (or expanding) lobe passages 27 helps to gradually separate or segment the flow of fuel 22 and air 24 into a plurality of fuel-air flows, which eventually exits from the downstream end portion 72 of the fuel nozzle assembly 20. In addition, the simultaneous convergence (e.g., decreasing width 117) of lobes 25 and lobe gaps 118 and divergence (e.g., increasing width 114) of lobe passages 27 helps to maintain a suitable flow rate through the fuel nozzle assembly 20, e.g., by substantially reducing any losses, maintaining a substantially constant cross-sectional flow area, and/or gradually increasing the cross-sectional flow area in the downstream direction. For example, an inversely proportional relationship between the radial dimension 114 and the radial dimension 117 (or a radial dimension of the lobes 25) may help to maintain the substantially constant cross-sectional flow area in the downstream direction. In certain embodiments, a lobe dimension of at least one lobe 25 of the plurality of lobes 25 changes inversely relative to a passage dimension of at least one passage 27 of the plurality of lobe passages 27 in a downstream axial direction 40 along the central axis 77 of the fuel nozzle assembly 20. The lobe dimension may include the radial lobe dimension 116 of the lobe 25, a lobe width (e.g., width 196 shown in FIG. 5) of the lobe 25, or a lobe cross-sectional area of the lobe 25 (i.e., through a radially 42 oriented plane). The passage dimension may include the radial passage dimension 114 of the lobe passage 27, a passage width (e.g., width 198 shown in FIG. 5) of the lobe passage 27, or a passage cross-sectional area of the lobe passage 27 (i.e., through a radially 42 oriented plane). In certain embodiments, the lobe dimension increases while the passage dimension decreases in the downstream axial direction 40 toward the downstream end portion 72, or the lobe dimension decreases while the passage dimension increases in the downstream axial direction 40 toward the downstream end portion 72, or a combination thereof.

For example, the lobe passages 27 have a first radial dimension 114 that is smaller than a second radial dimension 105 of the mixing chamber 104. Therefore, a hydraulic diameter of the fuel and air mixture flow in the mixing chamber 104 is greater than a hydraulic diameter of the fuel and air mixture flow in the lobe passages 27. For example, the hydraulic diameter of the mixing chamber 104 may be between approximately 10 millimeter (mm) and approximately 110 mm, and the hydraulic diameter of the lobe passages 27 may be between approximately 4 mm and approximately 10 mm. As discussed above, the hydraulic diameter is equal to 4 FA/P, where P is the perimeter surface in contact with the flow of the fuel/air mixture. In certain embodiments, the second radial dimension 105 decreases toward the downstream end portion 72 such that the smallest radial dimension of the mixing chamber 104 is approximately equal to the first radial dimension 114. In this way, a flow of the fuel and air mixture in the mixing chamber gradually converges toward the lobe passages 27, thereby increasing a flow velocity of the fuel and air mixture as it flows into the narrower lobe passages 27.

While segmenting the flow, the lobes 25 and lobe passages 27 may facilitate pre-mixing of the fuel 22 and the air 24. In addition to the fuel 22 from the fuel passage 102, the second mixing region 106 may receive more fuel 22 from a main body plenum chamber 120 (e.g., annular chamber) surrounding (e.g., about the axial axis 77) one or more main body vanes 124 (e.g., 1 to 50 vanes). In certain embodiments, each of the main body vanes 124 may be a swirl vane, such as an axial and/or radial swirl vane, configured to swirl the flow to enhance mixing of fuel and air. The main body plenum chamber 120 and one or more main body vanes 124 (e.g., 2, 3, 4, 5, 6, 7, 8, 9, 10, or more) are upstream of the mixing chamber 104. The main body plenum chamber 120 is in fluid communication with a plurality of main vane openings 126 (e.g., 1 to 50 per vane) that enable a flow of the fuel 22 from the main body plenum chamber 120 into the mixing chamber 104. The main vane openings 126 may be disposed axially between a leading edge 125 and a trailing edge 127 of each vane 124, directly at or proximate to the trailing edge 127, or any other suitable location. The main body plenum chamber 120 includes a main body opening 128 (e.g., radial opening) on a main body outer wall 130 that supplies a radial flow (e.g., along the radial axis 42) of the fuel 22 to the main body plenum chamber 120. The fuel 22 flows from the main body plenum chamber 120 into the mixing chamber 104 through the main body opening 128. The main body vanes 124 (e.g., swirl vanes) facilitate mixing of the fuel 22 and the air 24 flowing toward the mixing chamber 104. In the mixing chamber 104, the fuel 22 from the main body plenum chamber 120 and the air 24 mix with the fuel 22 from the fuel passage 102.

The fuel 22 in the fuel passage 102 and the main body plenum chamber 120 may be the same or different. For example, in one embodiment, the fuel 22 in the fuel passage 102 may be one type of fuel and the fuel 22 in the main body plenum chamber 120 may be a second type of fuel different from the first type of fuel 22 in the fuel passage 102. For example, the fuels may different gas fuels, different liquid fuels, or a combination of different gas and liquid fuels. In other embodiments, the type of fuel 22 in both the fuel passage 102 and the main body plenum chamber 120 may be the same. In addition, the fuel 22 in the fuel passage 102 and the main body plenum chamber 120 may be the same or different composition. As should be noted, the fuel 22 in the center pilot passage 78, 80 may also be the same or different from the fuel 22 in the fuel passage 102, the main body plenum chamber 120, or a combination thereof. As such, the multiple fuel injection passages (e.g., the center pilot passage 78, 80, the fuel passage 80, and the main body plenum chamber 120) enable the fuel nozzle assembly 20 to use at least two distinct fuels. Again, the fuels may different gas and/or liquid fuels.

As discussed above, the mixing chamber 104 may converge into the throat 107 and/or partially into the lobe passages 27, e.g., the radial dimension 105 may decrease in the downstream direction from the chamber 104 to the throat 107 and/or the radial dimension 114 along an upstream portion of the lobe passages 27 may be less than the radial dimension 105. As a result, as the fuel and air mixes downstream from the vanes 124 and the fuel ports 103, the fuel-air flow may experience a convergence in cross-sectional flow area and an associated drop in pressure and increase in fluid velocity, thereby enhancing fuel-air mixing of the flows passing through the lobe passages 27. In addition, as discussed in detail below, with reference to FIGS. 7-13, the lobe passages 27 may have a variable radial dimension 114 along the axial axis 77, such that a change in pressure between the fuel and air mixture in the lobe passages 27 and the fuel and air mixture in the combustion region is similar or equal to the pressure change of the fuel and air mixture in systems that do not include the lobed shroud 26. For example, the lobe passages 27 may have an increasing radial dimension 114 or a combination of increasing and decreasing radial dimensions or diameters 114 toward the downstream end portion 72, such that the largest radial dimension 114 of the lobe passages 27 is at the downstream end portion 72. The increasing radial dimension 114 of the lobe passages 27 toward the downstream end portion 72 also may increase the residence time of the fuel and air mixture in the lobe passages 27, thereby enhancing mixing of the fuel 22 and the air 24 in the second mixing region 106.

In addition to the primary flame generated from the fuel and air mixture in the center pilot 70 and the lobe passages 27, the fuel nozzle assembly 20 is configured to generate small-scale secondary flames (e.g., micro flames) on an aft side 142 of the fuel nozzle assembly 20. The micro flames create a compact fuel and air combustion zone (e.g., reaction zone) that may reduce emissions associated with high temperature firing (e.g., greater than approximately 1500° C. (approximately 3000° F.)) and/or small combustors. For example, the lobed shroud 26 includes a third mixing region 146 (e.g., micro mixing region) having a lobe finger 148 (e.g., oxidant supply passage and/or air-fuel micro-mixing passage) and a lobe fuel passage 150 (e.g., intersecting the lobe finger 148) associated with one or more of the lobes in the lobed shroud 26. As discussed in further detail below, the lobe finger 148 (e.g., passage) receives fuel from the fuel passage 150 and also receives oxidant (e.g., air) upstream from the fuel passage 150, thereby enabling micro-mixing of fuel and air within the finger 148. In certain embodiments, the lobe finger 148 is oriented at an angle 152 (e.g., an acute angle) relative to the shroud outer wall 154 (e.g., outer annular wall, out perimeter, outer circumference) and/or the axial axis 77. The acute angle 152 may be any angle less than 90 degrees, such as approximately 0 to 85, 5 to 80, 10 to 70, 20 to 60, 30 to 50, 5 to 45, 5 to 30, or any suitable angle therebetween. For example, the angle 152 may be less than or equal to 0, 5, 10, 15, 20, 25, 30, 35, 40, 45, 50, 60, 75, 80, 85, or 89 degrees. In certain embodiments, at least a portion of the lobe finger 148 may be oriented at a 90 degree angle with respect to the shroud outer wall 154.

The lobe finger 148 includes a lobe finger opening 156 (e.g., a radial opening) formed in the shroud outer wall 154, and a lobe pilot opening 160 at the downstream end portion 72 of the fuel nozzle assembly 20. The lobe finger opening 156 supplies air 24 into the finger 148 (e.g., passage) upstream from the fuel 22 supplied by the fuel passage 150. The lobe pilot opening 160 is disposed on a lobe 25 that forms part of a lobe outer wall 164. In certain embodiments, the lobe pilot opening 160 is disposed within a lobe recess 170 (e.g., pocket) on the lobe outer wall 164. The lobe recess 170 may have a recess depth 171 (e.g., axial 40 depth) between approximately 1 mm and approximately 10 mm. As discussed in further detail below with reference to FIGS. 11-13, the lobe recess 170 radially extends (e.g., in the radial direction 42) along at least a portion of the lobe 25. For example, the lobe recess 170 may have a length equal to or greater than approximately 10%, 20%, 30%, 40, 50%, 60%, 70%, 80%, 90% or more a length of the lobe 25 in the radial direction 42. The recess depth 171 may be constant or variable along the length of the lobe 25 (e.g., along the radial axis 42). As should be noted, in other embodiments, the lobe 25 does not include the lobe recess 170. In this particular embodiment, the lobe 25 has a blunt surface (e.g., no recesses associated with the lobe pilot openings 160).

The third mixing region 146 also includes a lobed pilot plenum chamber 172 (e.g., annular chamber) disposed within the main body 60 that receives the fuel 22 through a lobe fuel opening 174 (e.g., radial opening) disposed on the main body outer wall 130. The lobe pilot plenum chamber 172 is fluidly coupled to the lobe fuel passage 150, which feeds the lobe finger 148 (e.g., micro-mixing fluid passage) with the fuel 22 via a lobe fuel passage opening 176 disposed at an interface between the lobe finger 148 and the lobe fuel passage 150. The lobe fuel passage opening 176 is downstream from the lobe finger opening 156 a distance 178 (e.g., axial 40 distance or distance along finger 148). While the lobe fuel passage opening 176 may be any suitable distance 178 downstream of the lobe finger opening 156, it may be desirable for the lobe fuel passage opening 176 to be in the vicinity of the lobe finger opening 156. In this way, the fuel 22 and the air 24 may have a suitable residence time in the lobe finger 152 for premixing (e.g., micro-mixing) to form a homogenous mixture. The fuel and air mixture in the lobe finger 148 exits the fuel nozzle assembly 20 through the lobe pilot opening 160, thereby generating the micro flames (e.g., the small secondary flames) on the aft side 142 of the fuel nozzle assembly 20. As discussed above, the micro flames anchor the plurality of primary flames generated from the fuel and air mixture in the mixing regions 90, 104 to the fuel nozzle assembly 20, thereby stabilizing the plurality of primary flames.

Figure 4:
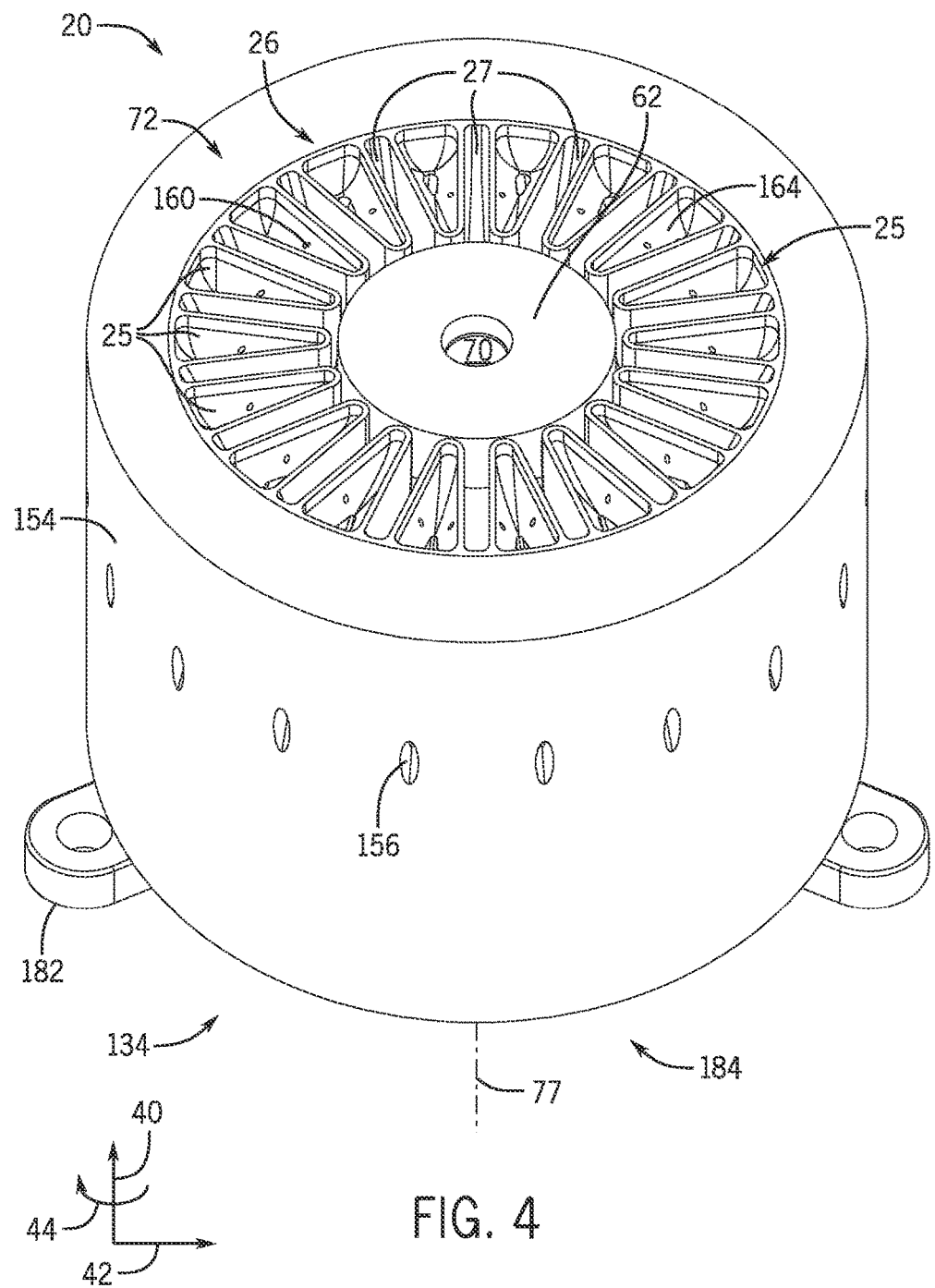
FIG. 4 is a perspective view of an embodiment of a downstream end portion of the fuel nozzle assembly of FIG. 3, wherein the downstream end portion of the fuel nozzle assembly includes the lobed shroud having multiple lobes and injection ports.

FIG. 4 is a perspective view of a portion of the fuel nozzle assembly 20, illustrating the lobed shroud 26. In the illustrated embodiment, the lobe finger openings 156 in the shroud outer wall 154, the lobes 25, the lobe pilot opening 160 in the lobes 25, and the lobe passages 27 are circumferentially 44 spaced apart about the axial axis 77, such that the openings 156, the lobes 25, the openings 160, and the lobe passages 27 surround (e.g., encircle) the center body 62 of the fuel nozzle assembly 20. The fuel nozzle assembly 20 may include greater than or equal to 1, 2, 3, 4, 5, 6, 7, 8, 9, 10, 15, 20, 25, 30, 40, 50, or 100 openings 156, openings 160, lobes 25, and lobe passages 27 circumferentially 44 spaced about the axial axis 77. As discussed above, the lobe fingers 148 (e.g., micro-mixing passages) extend between and fluidly couple the lobe pilot openings 160 in the lobes 25 with the lobe finger openings 156, which supply a flow of air into the lobe fingers 148 for pre-mixing (e.g., micromixing) with fuel from the fuel passages 150. In certain embodiments, the lobe finger openings 156 are circumferentially 44 aligned with the respective lobe pilot openings 160, such that the lobe fingers 148 (e.g., passages) are generally oriented along the radial axis 42 to intersect with the axial axis 77. In some embodiments, the lobe finger openings 156 are circumferentially 44 offset from the respective lobe pilot openings 160, such that the lobe fingers 148 (e.g., passages) are generally angled at an offset from the axial axis 77 to induce a swirling flow about the axial axis 77.

The lobed shroud 26 also includes one or more coupling features that facilitate coupling and securing the lobed shroud 26 to the main body 60. For example, the lobed shroud 26 may include one or more flanges 182 that align with a complementary coupling feature (e.g., flange, opening) on the main body 60. In embodiments that have more than one flange 182, the flanges 182 may be circumferentially spaced apart along a perimeter of a bottom end 184 of the lobed shroud 26. The flanges 182 may be secured, e.g., via screws, bolts, snaps, or any other suitable fastener, to the complementary coupling feature on the main body 60. In certain embodiments, the lobed shroud 26 may include protrusions and/or recesses on a surface at the bottom end 184 that interfaces with a top end surface of the main body 60. The protrusions and/or recesses may couple to a complementary protrusion/recess on the top end surface of the main body (e.g., via interference fit or other coupling arrangement) to removably secure the lobed shroud 26 and the main body 60. By removably coupling the lobed shroud 26 and the main body 60, the lobed shroud 26 may be removed without disassembly of system 10. Therefore, the lobed shroud 26 may be easily removed during system maintenance (e.g., cleaning) or replacement of the system components (e.g., lobed shroud 26 or main body 60). Accordingly, equipment and maintenance cost associated with the system 10 may be decreased.

Figure 5:
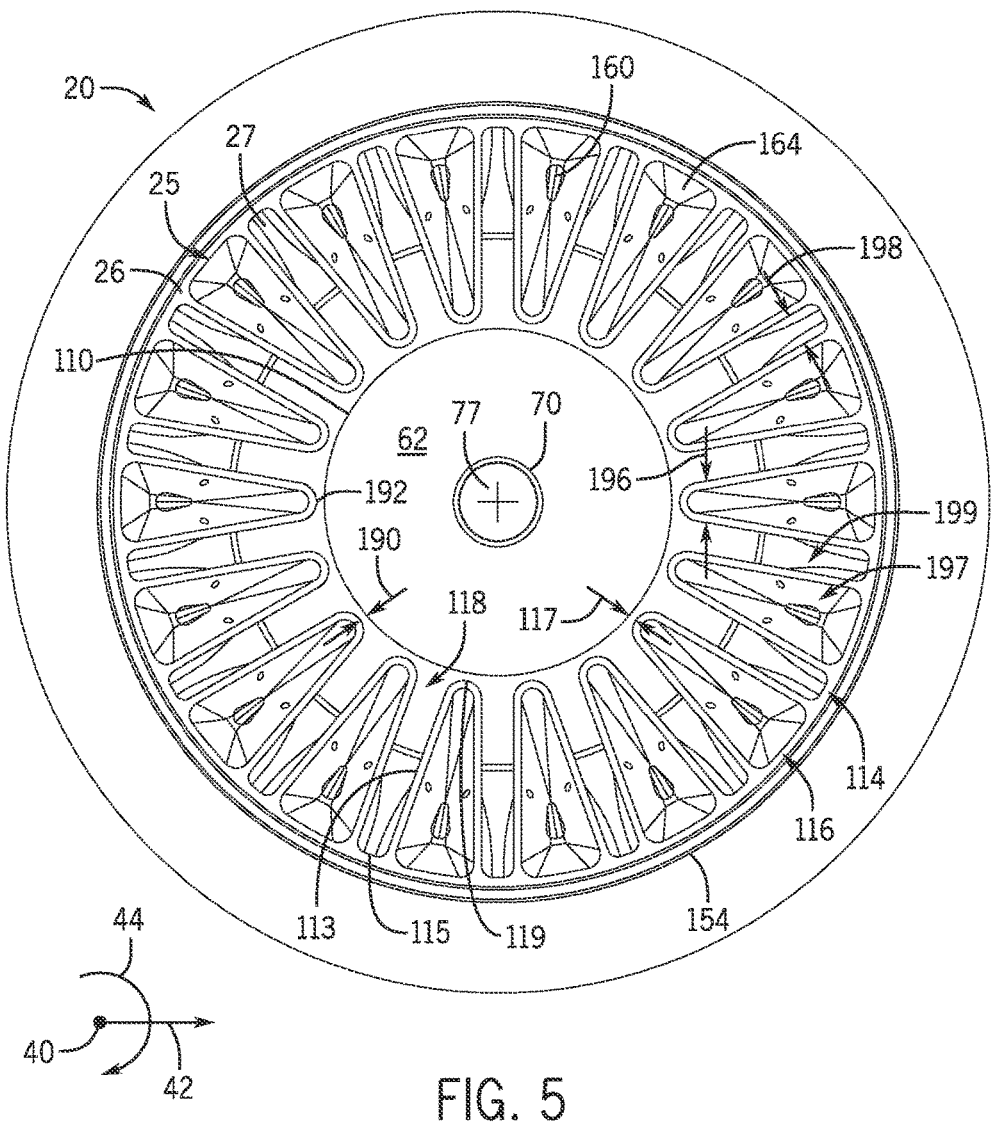
FIG. 5 is a top view of an embodiment of the downstream end portion of the fuel nozzle assembly of FIG. 3, wherein the downstream end portion includes the lobed shroud having multiple lobes circumferentially spaced apart about an axial axis of the fuel nozzle assembly, and radially extending toward a center pilot of the fuel nozzle assembly.

FIG. 5 is an embodiment of a top view of the downstream end portion 72 of the fuel nozzle assembly 20, illustrating the lobed shroud 26 with an annular arrangement of the lobes 25 and lobe passages 27 circumferentially 44 spaced about the center body 62. As illustrated, the lobed shroud 26 includes greater than 20 lobes 25 and lobe passages 27. In certain embodiments, the lobed shroud 26 may include greater than or equal to 2, 3, 4, 5, 6, 7, 8, 9, 10, 15, 20, 25, 30, 35, 40, 45, or 50 lobes 25 and lobe passages 27. For example, the lobed shroud 26 may include 5 to 100, 10 to 75, 15 to 50, or 20 to 40 lobes 25 and lobe passages 27. The lobes 25 and lobe passages 27 may be spaced, sized, and/or shaped uniformly or non-uniformly circumferentially 44 about the center body 62. However, the lobed shroud 26 may have any suitable number, size, spacing, and/or shape of lobes 25 and lobe passages 27 to facilitate segmenting the fuel and air mixture to generate a desired number and shape of the primary flame.

Figure 6:
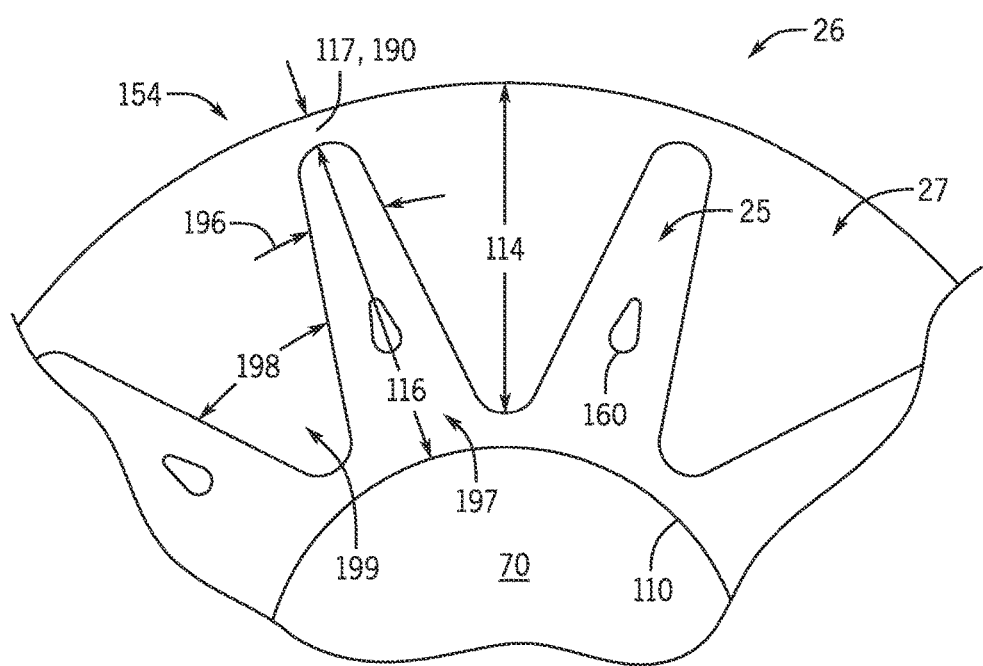
FIG. 6 is a partial top view of an embodiment of the downstream end portion of the fuel nozzle assembly of FIGS. 3 and 5.

In the illustrated embodiment, the lobes 25 radially 42 extend toward the center body 62, while maintaining the lobe gaps 118 between the center body wall 110 and the radially innermost surface 119 of the shroud wall 113. For example, at the downstream end portion 72, the lobe gaps 118 may include a radial gap 190 between a lobe tip 192 of the lobe 25 and the center body wall 110. The radial gap 190 is the radial dimension 117 of the lobe gaps 118 between the center body wall 110 and the radially innermost surface 119 of the shroud wall 113 of the lobed shroud 26, specifically at the downstream end portion 72. At the downstream end portion 72, the radial gap 190 may be between approximately 0.01 to 50, 0.02 to 25, 0.03 to 10, 0.04 to 5, 0.05 to 2, or 0.1 to 1.5 mm. For example, the radial gap 190 may be less than or equal to approximately 0.1, 0.2, 0.3, 0.4, 0.5, 0.6, 0.7, 0.8, 0.9, 1, 1.1, 1.2, 1.3, 1.4, 1.5, or 2 mm. In other embodiments, the lobes 25 extend radially away from the center body 62 toward the shroud outer wall 154, and form radial gaps 190 between the lobe tips 192 and the shroud outer wall 154, as illustrated in FIG. 6.

The lobes 25 may have a constant or variable dimension (e.g., axial lobe dimension 123, radial lobe dimension 116, width 196, and/or cross-sectional area 197) in the axial direction 40, the radial direction 42, and/or the circumferential direction 44. Furthermore, the lobe passages 27 may have a constant or variable dimension (e.g., axial passage dimension 121, radial passage dimension 114, width 198, and/or cross-sectional area 199) in the axial direction 40, the radial direction 42, and/or the circumferential direction 44. For example, the radial lobe dimension 116, the width 196, and/or the cross-sectional area 197 of the lobe 25 may be constant in the axial direction 40 along at least 50, 60, 70, 80, 90, or 100 percent of the axial lobe dimension 123 of one or more lobes 25. Similarly, the radial passage dimension 114, the width 198, and/or the cross-sectional area 199 of the lobe passage 27 may be constant in the axial direction 40 along at least 50, 60, 70, 80, 90, or 100 percent of the axial passage dimension 121 of one or more lobe passages 27. By further example, the radial lobe dimension 116, the width 196, and/or the cross-sectional area 197 of the lobe 25 may gradually increase and/or gradually decrease in the axial direction 40 along at least 50, 60, 70, 80, 90, or 100 percent of the axial lobe dimension 123 of one or more lobes 25. Similarly, the radial passage dimension 114, the width 198, and/or the cross-sectional area 199 of the lobe passage 27 may gradually increase and/or gradually decrease in the axial direction 40 along at least 50, 60, 70, 80, 90, or 100 percent of the axial passage dimension 121 of one or more lobe passages 27. By further example, the axial lobe dimension 123, the radial lobe dimension 116, the width 196, and/or the cross-sectional area 197 of the lobes 25 may be constant, increasing, decreasing, and/or alternatingly increasing and decreasing in the circumferential direction 44 about the axial axis 77 among all or a subset of the plurality of lobes 25. Similarly, the axial passage dimension 121, the radial passage dimension 114, the width 198, and/or the cross-sectional area 199 of the lobe passage 27 may be constant, increasing, decreasing, and/or alternatingly increasing and decreasing in the circumferential direction 44 about the axial axis 77 among all or a subset of the plurality of lobe passages 27.

For example, in one embodiment, the first lobe dimension or width 196 (e.g., circumferential 44 dimension or width) may decrease in the radial direction 42 from the shroud outer wall 154 toward the lobe tip 192 and the center body 62 (e.g., toward axial axis 77), such that the lobe 25 has a tapered configuration in the radial direction 42 (e.g., converging or tapered inwardly toward the axis 77). The first lobe dimension 196 may be determined such that an exiting hydraulic diameter of the lobe passage 27 is less than approximately 5 mm. In general, the smaller the slot width (hydraulic diameter), the shorter the main flame length for a given velocity. In certain embodiments, at least a portion of the first lobe dimension 196 may be at least 1.5, 2, 2.5, 3, 4, or 5 times the passage dimension or width 198 (e.g., circumferential 44 dimension or width) of the lobe passages 27. The first lobe dimension 196 (e.g., circumferential 44 dimension or width) of the lobe 25 may also vary in the axial direction 40 along the axial lobe dimension 123. For example, the width 196 of the lobe 25 may decrease in the axial upstream direction 40 toward the upstream end portion 134, while the width 198 of the lobe passage 27 may increase, decrease, or remain constant in the axial upstream direction 40 toward the upstream end portion 134. In other embodiments, the width 196 of the lobe 25 may increase or remain constant in the axial upstream direction 40 toward the upstream end portion 134, while the width 198 of the lobe passage 27 may increase, decrease, or remain constant in the axial upstream direction 40 toward the upstream end portion 134. In certain embodiments, the width 196 of the lobe 25 may increase while the width 198 of the lobe passage 27 may decrease in an inversely proportional relationship in the axial upstream direction 40 toward the upstream end portion 134, or the width 196 of the lobe 25 may decrease while the width 198 of the lobe passage 27 may increase in an inversely proportional relationship in the axial upstream direction 40 toward the upstream end portion 134, In addition to the widths 196 and 198, the radial lobe dimension 116 of the lobe 25 and/or the radial passage dimension 114 of the lobe passage 27 may be constant or variable in the axial direction 40. For example, in certain embodiments, the radial lobe dimension 116 of the lobe 25 may decrease toward the upstream end portion 134, such that the radial lobe dimension 116 is longer at the downstream end portion 72 compared to the upstream end portion 132. Similarly, the radial passage dimension 114 of the lobe passage 27 may decrease toward the upstream end portion 134, such that the radial passage dimension 114 is longer at the downstream end portion 72 compared to the upstream end portion 132.

Figure 8:
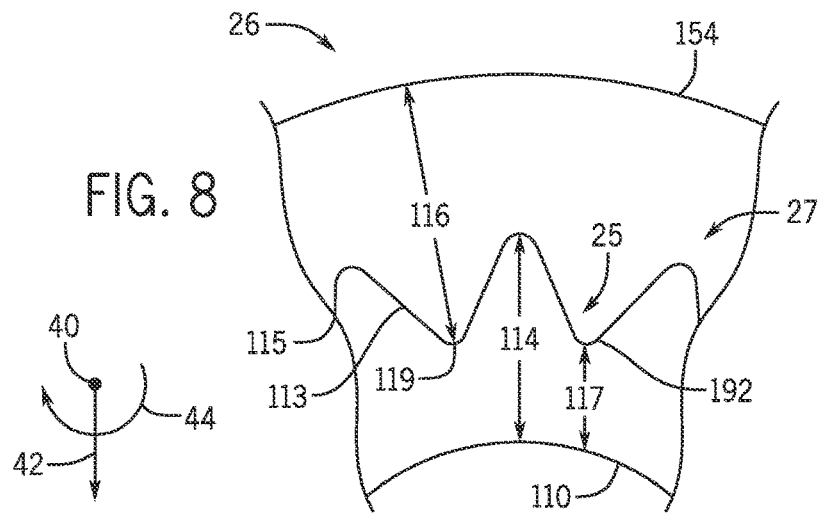
FIG. 8 is a partial cross-sectional top view of an embodiment of the lobed shroud of FIG. 7 taken along line 8-8, illustrating a radial length of the multiple lobes upstream of the downstream end portion of the fuel nozzle assembly.
Figure 9:
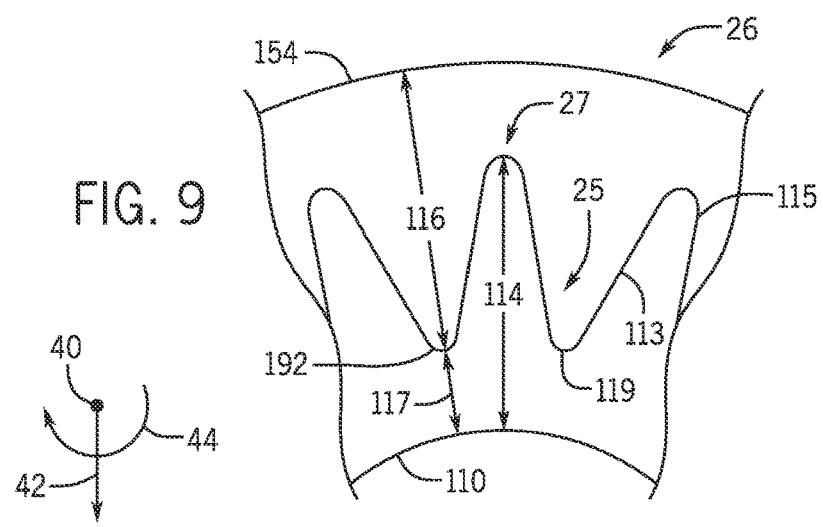
FIG. 9 is a partial cross-sectional top view of an embodiment of the lobed shroud of FIG. 7 taken along line 9-9, illustrating an increasing radial length of the multiple lobes in the downstream direction.
Figure 10:
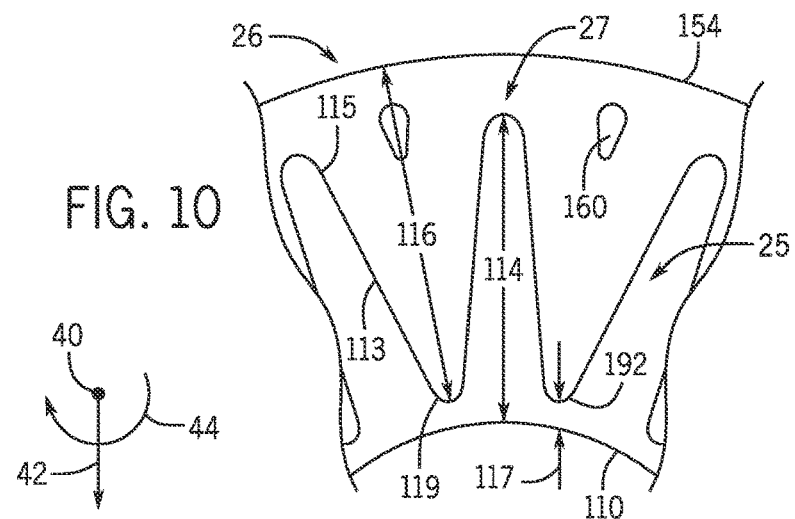
FIG. 10 is a partial cross-sectional top view of an embodiment of the lobed shroud of FIG. 7 taken along line 10-10, illustrating an increasing radial length of the multiple lobes in the downstream direction

For example, FIGS. 8-10 illustrate a top cross-sectional view of a portion of the lobed shroud 26 taken at lines 8-8, 9-9, and 10-10 of FIG. 7, which is a detailed cross-sectional side view of the lobed shroud 26. As illustrated in FIG. 8, the radial lobe dimension 116 (e.g., radial length along radial axis 40) of the lobe 25 at an upstream end portion 134 of the lobed shroud 26 is shorter than the radial lobe dimension 116 at a middle position (e.g., FIG. 9) and near a downstream end portion 72 (e.g., FIG. 10) of the lobed shroud 26. That is, the radial lobe dimension 116 of the lobe 25 increases in the axial direction 40 from the upstream end portion 134 of the lobed shroud 26 toward the downstream end portion 72. Similarly, as illustrated in FIG. 8, the radial passage dimension 114 (e.g., radial length along radial axis 40) of the lobe passage 27 at an upstream end portion 134 of the lobed shroud 26 is shorter than the radial passage dimension 114 at a middle position (e.g., FIG. 9) and near a downstream end portion 72 (e.g., FIG. 10) of the lobed shroud 26. That is, the radial passage dimension 114 of the lobe passage 27 increases in the axial direction 40 from the upstream end portion 134 of the lobed shroud 26 toward the downstream end portion 72. In addition, as illustrated by FIGS. 8, 9, and 10, the lobe gap 118 between the radially innermost surface 119 of the shroud wall 113 (e.g., the radial tip 192) of the lobe 25 and the center body wall 110 decreases inversely proportional relative to the radial lobe dimension 116 in the downstream axial direction 40 toward the downstream end portion 72. That is, as the radial lobe dimension 116 of the lobe 25 increases in the downstream axial direction 40 toward the downstream end portion 72, the lobe gap 118 decreases in the same downstream axial direction 40.

In this way, the dimensions of the lobe 25 (e.g., lobe dimensions 116, 117, and 196) and the dimensions of the lobe passage 27 (e.g., lobe passage dimensions 114 and 198) may be used to control the residence time of the fuel and air mixture in the lobe passage 27. Additionally, the hydraulic diameter of the lobe passages 27 may be adjusted based on the number of lobes 25 and/or dimensions (e.g., lobe dimensions 116, 117, and 196 and/or lobe passage dimensions 114 and 198), such that the pressure of the fuel and air mixture exiting the lobed shroud 26 is similar to or equal to a pressure of a fuel and air mixture exiting a fuel nozzle assembly that does not include a lobed shroud, such as the lobed nozzle shroud 26.

As discussed above, the lobed shroud 26 stabilizes the primary flame (e.g., the flame generated from the fuel and air mixture in the central pilot 70 and the lobe passages 27) by generating secondary micro flames that anchor the primary flame to the lobes 25. The secondary micro flames are generated from the fuel and air mixture generated within the lobed shroud 26 in the third mixing region 146. The fuel and air mixture exits the third mixing region 146 through the lobe pilot openings 160. The lobe pilot openings 160, and the respective lobe recess 170, may have any suitable shape that facilitates generating secondary micro flames to enable anchoring and stabilization of the plurality of primary flames.

FIGS. 11-13 illustrate various non-limiting examples of the lobe pilot openings 160 and the lobe recesses 170 associated with each lobe 25. As illustrated in FIG. 11, the lobe pilot opening 160 has a circular shape 210 (e.g., circular orifice, constant radius, or constant diameter). In contrast, as illustrated in FIGS. 12 and 13, the lobe pilot opening 160 has a non-circular shape 211. For example, the lobe pilot opening 160 has a first lobe pilot dimension 212 (e.g., width, diameter, or radius) that is smaller than a second lobe pilot dimension 214 (e.g., width, diameter, or radius). In certain embodiments, the lobe pilot opening 160 has alternating first and second dimensions 212, 214, such that the lobe pilot opening 160 has a wavy perimeter, as illustrated in FIG. 12. For example, the lobe pilot opening 160 of FIG. 13 may be described as a multi-bulb opening, a peanut shaped opening, or an alternatingly increasing and decreasing width opening. In other embodiments, the first dimension 212 gradually increases to the second dimension 214, such that the lobe pilot opening 160 has a tapered perimeter (e.g., triangular, wedge-shaped, converging, or diverging opening), as illustrated in FIG. 13.

In certain embodiments, the lobe recess 170 may have a similar shape to the lobe pilot opening 160 and/or the lobe 25. For example, as illustrated in FIGS. 11-13, the lobe recess 170 has a recess dimension 218 (e.g., circumferential 44 recess width) that decreases with a decreasing lobe width 196 in the radial direction 42, and a radial dimension 220 (e.g., radial 42 recess length) that extends at least a portion of the radial lobe dimension 116. Similar to the lobe pilot opening 160, the lobe recess 170 may have a circular shape, a wavy shape, oval shape, a wedge or tapered shape, or any other desirable shape. As should be noted, the lobe pilot opening 160 may be disposed along any portion of the radial lobe dimension 116. For example, the width 218 of the recess 170 may be 10 to 90, 20 to 80, 30 to 70, 40 to 60, or 10 to 50 percent of the width 196 of the lobe 25 (e.g., at any particular radial position along the lobe 25). By further example, the length 220 of the recess 170 may be 10 to 90, 20 to 80, 30 to 70, 40 to 60, or 10 to 50 percent of the radial lobe dimension 116 of the lobe 25. By further example, a cross-sectional area 216 of the recess 170 may be 10 to 90, 20 to 80, 30 to 70, 40 to 60, or 10 to 50 percent of the cross-sectional area 197 of the lobe 25.

As discussed above, certain embodiments of the fuel nozzle assembly 20 include multiple fuel injection ports and mixing regions that may facilitate flame stabilization in the reaction zone (e.g., combustion region) of the combustor 14. The fuel nozzle assembly 20 includes the lobed shroud 26 having a plurality of lobes 25 and a plurality of lobe passages 27 that segment the flow path of the fuel and air mixture in the second mixing region 106. The lobes 25 and the center body wall 110 define the lobe passages 27, which have a smaller hydraulic diameter compared to the hydraulic diameter of the mixing chamber 104 upstream of and fluidly coupled to the lobe passages 27. The change in the hydraulic diameter between the mixing chamber 104 and the lobe passages 27 accelerates mixing of the fuel 22 and the air 24 to generate a homogenous fuel and air mixture, thereby generating a homogenous fuel and air mixture and stabilizing the primary flame in the reaction zone of the combustor 14. The lobed shroud 26 also includes the lobe fingers 148 (e.g., micro-mixing fuel-air passages) that premix an additional portion of the fuel 22 and the air 24 to generate secondary micro flames that anchor the primary flame to the fuel nozzle assembly 20, thereby providing further stabilization of the primary flame. In this way, emissions generated from combustion of the fuel and air mixture may be reduced for high flame temperatures (e.g., temperatures above 1500° C.) and/or small combustors that have a small reaction zone. In addition, the removable configuration of the lobed shroud 26 facilitates maintenance and replacement of components of the fuel nozzle assembly without complete disassembly of the system 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
   a fuel nozzle, comprising:
      a first wall disposed about a central axis;
      a second wall disposed about the first wall; and
      a plurality of lobes disposed between the first and second walls, wherein the plurality of lobes is spaced about the central axis to define a plurality of flow passages, wherein the plurality of lobes extends to a downstream end portion of the fuel nozzle, wherein a tip of each lobe of the plurality of lobes is radially spaced apart from the first wall by a radial gap to define an annular space between the plurality of lobes and the first wall such that the plurality of lobes is not in contact with the first wall, wherein at least one lobe of the plurality of lobes comprises a downstream end face comprising a recessed wall between the second wall and the radial gap, wherein the recessed wall extends along a length and a width of the at least one lobe of the plurality of lobes, and wherein the downstream end face comprises a first opening disposed on the recessed wall.

2. The system of claim 1, wherein the at least one lobe of the plurality of lobes has a variable radial lobe dimension along an axial lobe dimension of the at least one lobe, or at least one passage of the plurality of flow passages has a variable radial passage dimension along an axial passage dimension of the at least one passage, or a combination thereof.

3. The system of claim 2, wherein the variable radial lobe dimension gradually increases or decreases in a downstream direction, or the variable radial passage dimension gradually increases or decreases in the downstream direction, or a combination thereof.

4. The system of claim 1, wherein at least one lobe passage extends through the at least one lobe of the plurality of lobes and comprises a first passage that extends from a second opening disposed on an outer perimeter of the second wall to the first opening on the recessed wall of the downstream end face.

5. The system of claim 4, wherein a second passage intersects the first passage, and wherein the first passage is configured to flow an oxidant, and the second passage is configured to flow a fuel.

6. The system of claim 4, wherein the first passage radially converges toward the central axis in a downstream direction.

7. The system of claim 1, wherein the at least one lobe of the plurality of lobes has a constant radial lobe dimension along an axial lobe dimension of the at least one lobe, or at least one flow passage of the plurality of flow passages has a constant radial passage dimension along an axial passage dimension of the at least one flow passage, or a combination thereof.

8. The system of claim 1, wherein a lobe dimension of the at least one lobe of the plurality of lobes changes inversely relative to a passage dimension of at least one flow passage of the plurality of flow passages in a downstream direction along the central axis of the fuel nozzle.

9. The system of claim 8, wherein the lobe dimension comprises a radial lobe dimension, a lobe width, or a lobe cross-sectional area, wherein the passage dimension comprises a radial passage dimension, a passage width, or a passage cross-sectional area.

10. The system of claim 8, wherein the lobe dimension increases while the passage dimension decreases in the downstream direction.

11. The system of claim 1, comprising a gas turbine combustor, or a gas turbine engine, or a combination thereof, having the fuel nozzle.

12. A system, comprising:
a fuel nozzle, comprising:
a first wall disposed about a central axis; and
a plurality of lobes, wherein the plurality of lobes is spaced about the central axis to define a plurality of flow passages, wherein the plurality of lobes extends to a downstream end portion of the fuel nozzle, wherein a tip of each lobe of the plurality of lobes is radially spaced apart from the first wall by a radial gap to define an annular space between the plurality of lobes and the first wall such that the plurality of lobes is not in contact with the first wall, wherein at least one lobe of the plurality of lobes comprises a downstream end face comprising a recessed wall between a second wall of the fuel nozzle and the radial gap, wherein the recessed wall extends along a length and a width of the at least one lobe of the plurality of lobes, and wherein the downstream end face comprises a first opening disposed on the recessed wall.

13. The system of claim 12, wherein the fuel nozzle comprises a lobe passage extending through the at least one lobe of the plurality of lobes, wherein the lobe passage comprises a first passage extending from a second opening disposed on an outer perimeter of the fuel nozzle to the first opening, and a second passage intersecting the first passage, wherein the first passage is configured to flow an oxidant, and the second passage is configured to flow a fuel.

14. The system of claim 12, wherein the at least one lobe of the plurality of lobes has a constant radial lobe dimension along an axial lobe dimension of the at least one lobe, or at least one flow passage of the plurality of flow passages has a constant radial passage dimension along an axial passage dimension of the at least one flow passage, or a combination thereof.

15. The system of claim 12, wherein the at least one lobe of the plurality of lobes has a variable radial lobe dimension along an axial lobe dimension of the at least one lobe, or at least one flow passage of the plurality of flow passages has a variable radial passage dimension along an axial passage dimension of the at least one flow passage, or a combination thereof.

16. The system of claim 15, wherein the variable radial lobe dimension gradually increases or decreases in a downstream direction, or the variable radial passage dimension gradually increases or decreases in the downstream direction, or a combination thereof.

17. The system of claim 12, comprising a gas turbine combustor, or a gas turbine engine, or a combination thereof, having the fuel nozzle.

* * * * *